J. & S. P. Parham,
Fire Plug.

N° 19,511.        Patented Mar. 2, 1858.

N. PETERS, PHOTO-LITHOGRAPHER, WASHINGTON, D. C.

UNITED STATES PATENT OFFICE.

JNO. PARHAM, OF PHILADELPHIA, PENNSYLVANIA, AND SAML. P. PARHAM, OF TRENTON, NEW JERSEY.

HYDRANT.

Specification of Letters Patent No. 19,511, dated March 2, 1858.

*To all whom it may concern:*

Be it known that we, JOHN PARHAM, of Philadelphia, in the county of Philadelphia and State of Pennsylvania, and SAML. P. PARHAM, of Trenton, in the county of Mercer and State of New Jersey, have invented a new and useful Improvement in Fire-Plugs or Street-Hydrants; and we do hereby declare that the following is a full, clear, and exact description of the same, reference being had to the accompanying drawings, forming part of this specification, in which—

Figure 5:
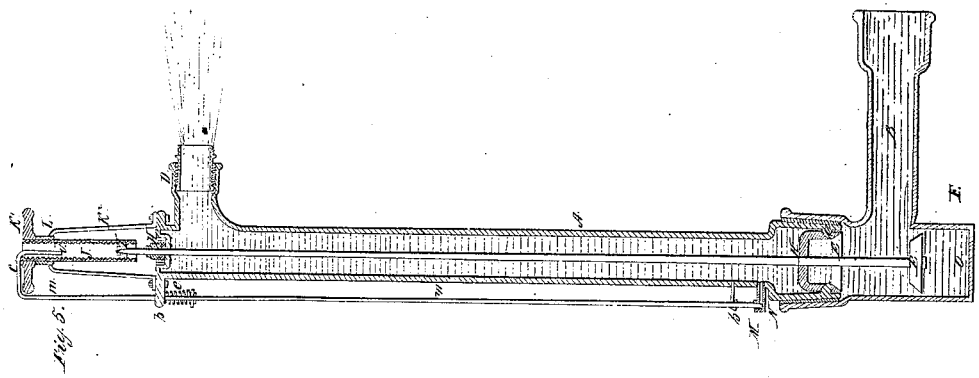
Figure 3:
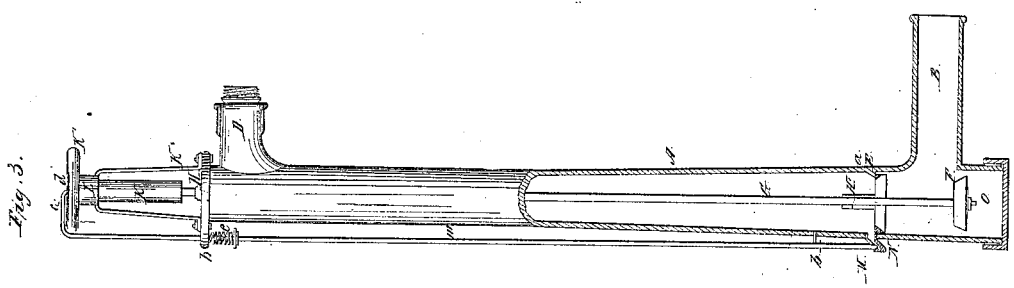
Figure 2:
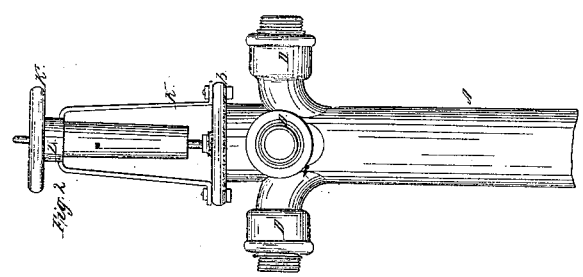
Figure 4:
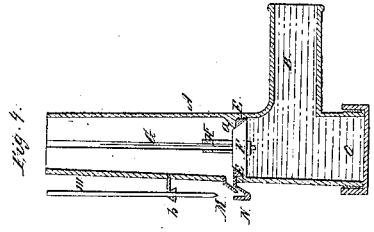
Figure 1:
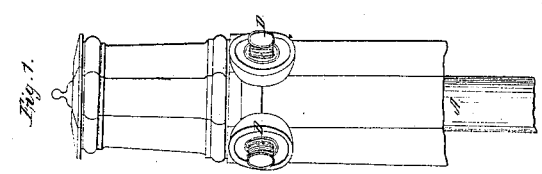

Figure 1, is an external view of a fire plug. Fig. 2, a similar view of a street hydrant. Fig. 3, is a vertical longitudinal section of a street hydrant showing our present improvements whereby the whole of the waste water is let off, the valve of the main being open. Fig. 4, is also a vertical longitudinal section the valve of the main being closed. Fig. 5, is a vertical longitudinal section of a former hydrant of ours wherein the waste water is but partly let off, this view being given in order to better illustrate the advantage of our present improvement.

Similar letters of reference in each of the several figures indicate corresponding parts.

The nature of our invention consists in the peculiar combined arrangement for a fire plug or street hydrant, consisting of the case or cylinder, of the plug or hydrant which has its valve seat on a level with the bottom of the waste passage so that the whole of the waste water may discharge, and its main or supply pipe a short distance above the lower end of the cylinder so that the valve may be let down below out of the way of the free passage of the water; and the hollow revolving, but not rising and falling female nut which is made to operate the screw rod of the supply valve, so as to force it down into the reception chamber below the supply pipe and the waste valve which is coupled loosely and peculiarly to the main valve rod and fast to a spring, so as to be held closed when the main valve is opened, and opened when it is shut.

To enable others skilled in the art to make and use our invention, we will proceed to describe its construction and operation.

A, represents the plug case or cylinder which may be constructed of cast iron, its lower end being formed as in Fig. 3, with the main or supply pipe B, upon it instead of being inserted in the top of main or supply pipe as usual or as shown in Fig. 5. The lower part of the plug or cylinder is inserted in the ground and the whole suitably inclosed.

The upper end of the cylinder A, is provided with three nozzles D, D, D, and the lower part of the cylinder just at a point on a level with a waste passage to be presently described, being furnished with a beveled flange *a*, internally, so as to form a stop for a conical valve seat E, to bear up against as shown.

F, is a conical valve. It is attached to a rod G, which passes through the guide H', of the valve seat and through the stuffing box H, in the upper end of the cylinder A. This rod G, has a screw nut I, on its upper end, said screw nut fitting in a female screw J, cut in a tube K, the upper end of which is provided with a hand wheel K'. The tube K, is fitted and allowed to turn freely within a socket L, of a standard $K^2$, of the cylinder A, but is prevented from rising and falling as the valve descends or rises by the standard and the hand screw.

M, is a waste valve. Its rod *m*, is fitted in guides *b*, attached to one side of the cylinder A. The lower end of this rod is fitted in a small waste pipe N, communicating with the lower part of the cylinder on a level with the top of the valve seat. The upper end of the waste valve rod is bent over in a horizontal position as shown at *c*, and then downward as shown at *d*, the part *d*, entering the upper end of the tube K, so as to be struck and raised by the upper end of valve rod when the valve is being closed, see Fig. 5. A spiral spring *e*, is placed fast on the rod *m*, below the cap or flange of the cylinder, said spring having a tendency to keep the waste valve M, of the rod in the waste pipe N.

The main or supply pipe is connected a short distance above the bottom of the cylinder A, so as to leave a chamber O, below it, to receive the valve F, when the latter is depressed or opened so as to stand below, or entirely out of the way of the supply passage as shown in Fig. 3.

It will be seen by referring to Fig. 3, that when the valve F, is depressed or lowered, an unobstructed water passage is allowed the water through the main pipe B, into cylinder A. The ordinary fire plugs when depressed remain in the center of the main pipe and the water is compelled to pass around its sides through the contracted space between the valves and the side of the main pipe, and this space is frequently obstructed by blocks of wood and rubbish contained in the water. By our improvements, a much larger volume of water than usual can be discharged in a given time sufficient to supply three different hose at the same time, whereas the ordinary fire plugs are capable of supplying but one. It will also be seen that the valve F, is opened and closed by turning the tube K, the rod G, being raised or lowered according to the direction in which the tube K, is turned, the screw I, of rod G, passing up and down within tube K. By this arrangement the hand wheel K', always remains in the same position or at the same height above the cylinder A, so that it can be conveniently turned by the operator when the top of the case is raised. The valve rods of the ordinary fire plugs are operated by a screw passing through a stationary nut and attached by a swivel connection to the upper end of the valve rod. The screw and hand wheel in this case rise and fall with the valve rod, and the rod therefore cannot be operated or turned so conveniently as the one in our improvement, for when the hand wheel is at the lower part of the case, the operator must stoop considerably in order to reach it. The waste valve and rod M, m, are raised when the valve F, is closed as the upper end of the rod G, strikes against the bent end d, of said rod and the orifice of the waste pipe N, being thereby opened, the whole of the waste water in cylinder A, is allowed to escape owing to the valve seat being on a level with it, and the supply pipe B, again opened, the waste valve instantly closes by means of the spring e.

What we claim as our invention and desire to secure by Letters Patent, is—

The peculiarly combined arrangement, for a fire-plug or street hydrant, consisting of the case or cylinder A, of the plug or hydrant, which has its valve seat E, on a level with the bottom of the waste passage N, so that the whole of the waste water may discharge; and its main or supply pipe B, a short distance above the lower end of the cylinder so that the valve F, may be let down below out of the way of the free passage of the water; and the hollow revolving, but not rising and falling, female nut J, K, which is made to operate the screw rod of the supply valve so as to force it down into the reception chamber O, below the supply pipe B; and the waste valve M, m, which is coupled loosely and peculiarly to the main valve rod G, and fast to a spring e, so as to be held closed when the main valve is opened, and opened when it is shut, all substantially as and for the purpose set forth.

The above specification of our improved fire plug and street hydrant signed by us this 25th day of January 1858.

JOHN PARHAM.
SAML. P. PARHAM.

Witnesses:
THOMAS F. WAGANER,
WM. C. HOWELL.